July 28, 1942.  C. H. DODGE  2,291,073
KNIFE GRINDER
Filed May 19, 1941  3 Sheets-Sheet 1

Inventor:
Charles H. Dodge,
by Charles Shurey
his Atty.

July 28, 1942.                C. H. DODGE                2,291,073
                              KNIFE GRINDER
                          Filed May 19, 1941            3 Sheets-Sheet 2
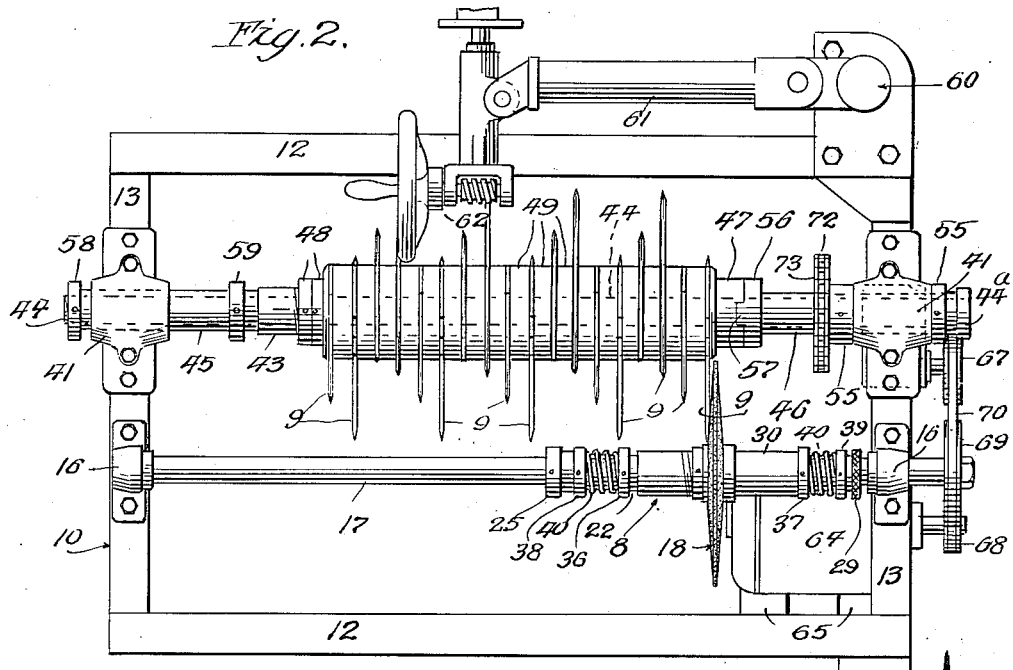
Fig. 2.
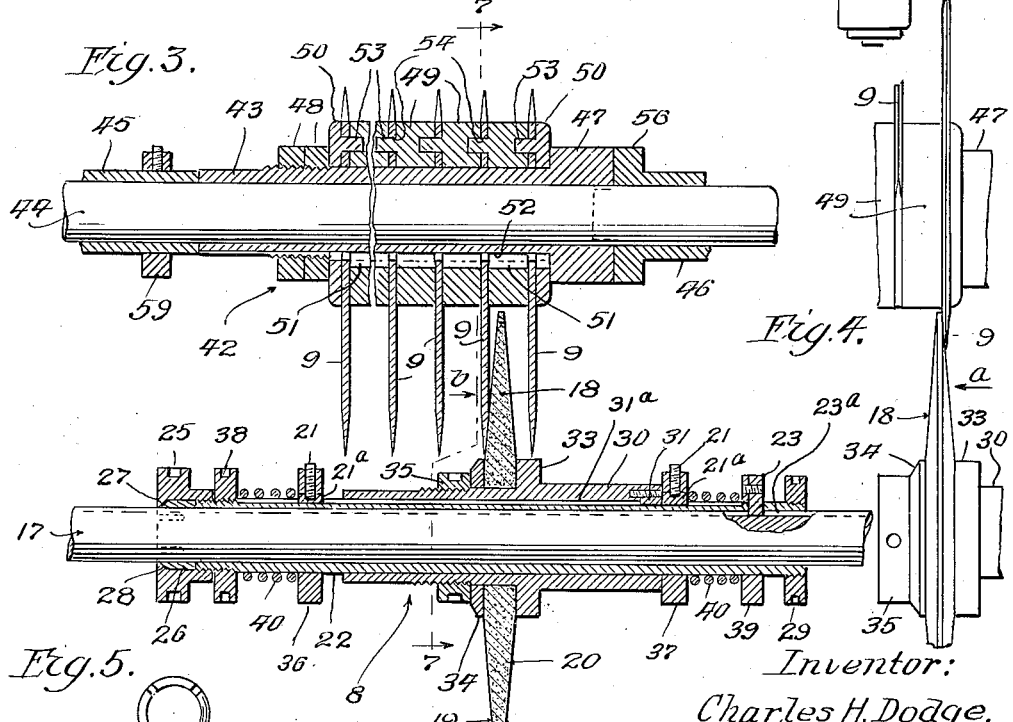
Fig. 3.
Fig. 4.
Fig. 5.
Inventor:
Charles H. Dodge,
by Charles O. Shervey,
his Atty.

July 28, 1942.  C. H. DODGE  2,291,073
KNIFE GRINDER
Filed May 19, 1941  3 Sheets-Sheet 3
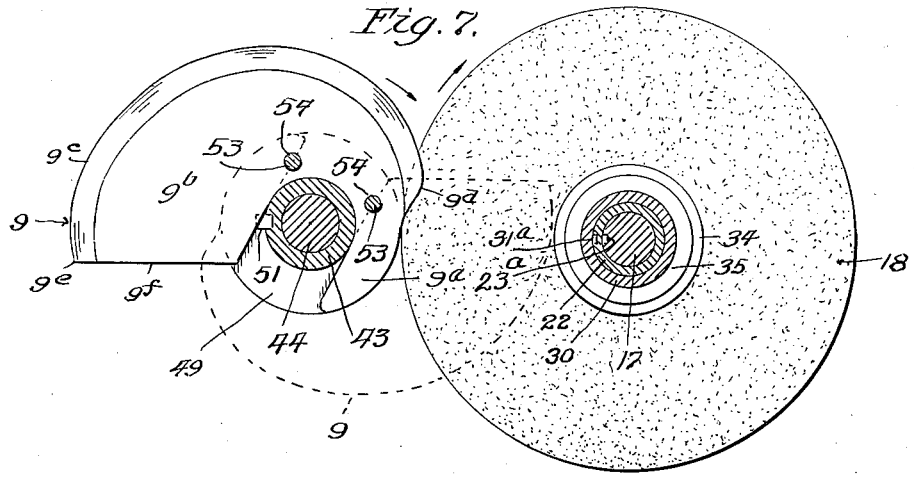
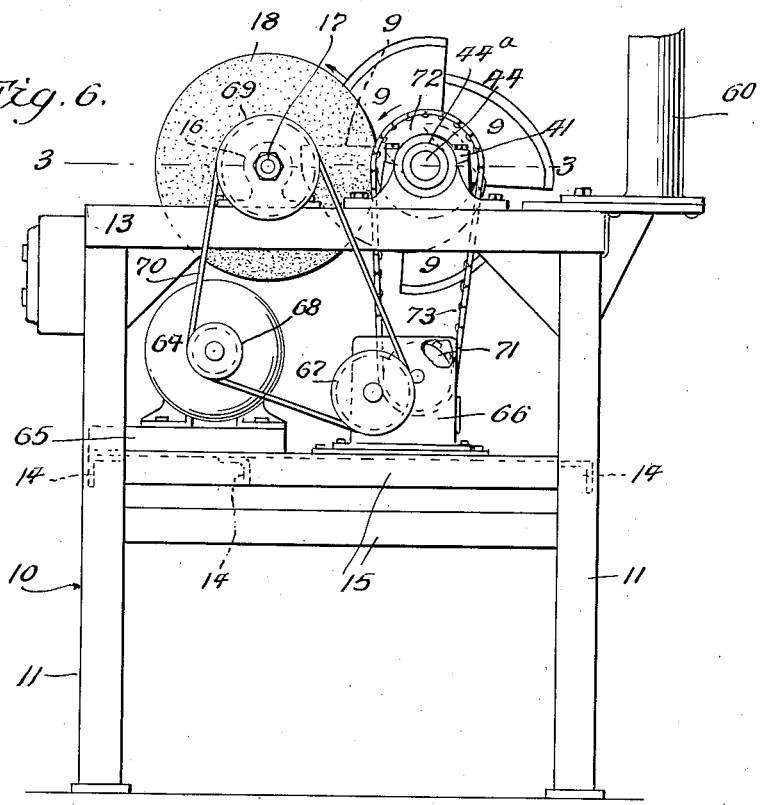
Inventor:
Charles H. Dodge,
by Charles O. Shirvey,
his Atty.

Patented July 28, 1942

2,291,073

UNITED STATES PATENT OFFICE 2,291,073

KNIFE GRINDER

Charles H. Dodge, Chicago, Ill., assignor to The Globe Company, Chicago, Ill., a corporation of Illinois Application May 19 1941, Serial No. 394,042

12 Claims. (Cl. 51—131)

This invention relates to knife grinders and more particularly to grinders for grinding curved knives, such as sabre shaped knives, which are employed in certain machines for cutting up meat, vegetables, fruits and other commodities. Some machines of this character employ a semispherical rotating bowl for containing the commodity, in connection with rotatable sabre shaped knives mounted on a shaft which swings the knives through the commodity as the bowl is being rotated, thereby cutting up the contents into small or even minute particles. Knives used in machines of this character each have a curved cutting edge of a somewhat spiral form, which progresses in a curvilinear line from its shortest radius to its longest one.

Because of the curved shape of the knife edge of knives of this character, it is a difficult and laborious task to sharpen them, and one of the objects of this invention is to provide a knife grinder which grinds even, tapered cutting edges on the knives and dispenses with the services of a skilled knife grinder.

Another object is to provide a knife grinder in which a plurality of knives are mounted for rotation in connection with a knife grinding wheel, the sides of which taper toward each other from the hub portion thereof towards the periphery, the grinding wheel being mounted relative to the knife carrying means in such manner that one of its tapered side faces engages the side of the knife blade at its cutting edge and grinds the same throughout its extent.

Another object is to provide resilient means for holding the grinding wheel in grinding contact with the knife which is being ground.

Another object is to provide means for adjusting and setting the grinding wheel in grinding relation to each of the several knives.

Other objects and advantages will appear in the course of this specification, and with said objects and advantages in view, this invention consists in the novel features of construction, arrangement and combination of parts, hereinafter fully set forth and claimed.

The invention is clearly illustrated in the drawings accompanying this specification in which:

Fig. 2 is a plan thereof.

Fig. 3 is a detail enlarged horizontal section taken through the grinding wheel assembly and the knife carrying assembly, the line of section being indicated at 3—3 in Fig. 6.

Fig. 4 is a plan of parts of the grinding wheel assembly and the knife carrying assembly showing the knives in the position they occupy at the commencement of the grinding operation.

Fig. 5 is a detail end elevation of a certain split collar which is employed in the grinding wheel assembly.

Fig. 6 is an end elevation of the machine looking in the direction of the arrow 6 in Fig. 1, with a certain crane post partly broken away.

Fig. 7 is a detail enlarged vertical cross section through the grinding wheel assembly and the knife carrying assembly, the line of section being indicated at 7—7 in Fig. 3.

Figure 1:
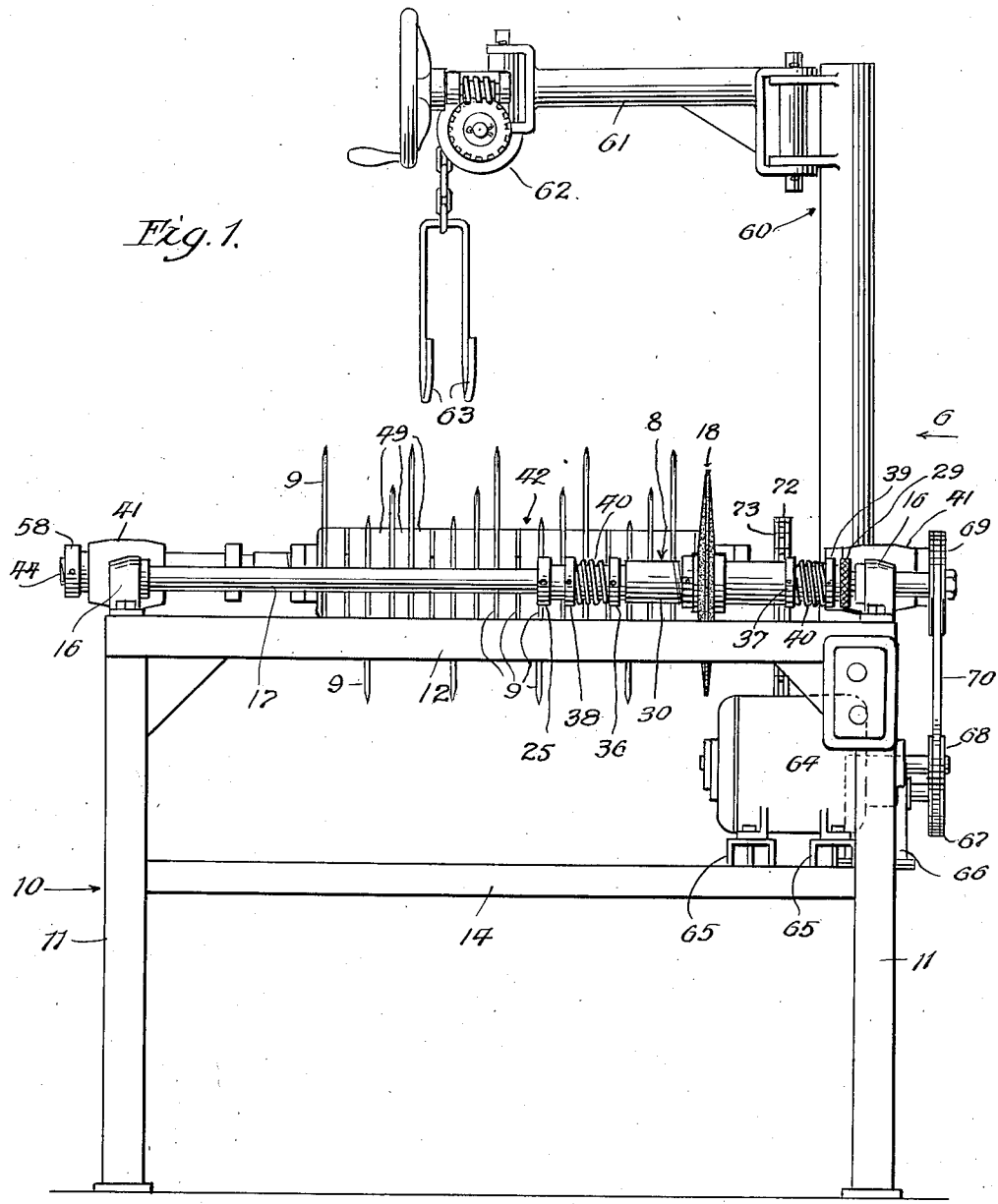
Fig. 1 is a front elevation of a knife grinder, embodying one form of the present invention.

Referring to said drawings, which are merely illustrative of one embodiment of the invention, the reference character 10 designates a frame, desirably composed of uprights or legs 11, and lengthwise and crosswise extending frame members 12, 13, secured to the upper ends of the legs and other lengthwise and crosswise extending frame bars 14, 15, secured to the legs below the upper ends thereof.

Bolted or otherwise secured to the frame members 13, are bearing brackets 16, in which is rotatably mounted a grinding wheel shaft 17. Mounted to rotate with the grinding wheel shaft, but having a sliding connection therewith, is a grinding wheel assembly 8, which carries the grinding wheel 18. The latter is composed of suitable abrasive material for grinding the knives. The side faces 19, 20, of the grinding wheel are beveled from the hub portion thereof to the periphery, as is more clearly illustrated in Fig. 3, and the beveled faces are arranged to engage the side faces of the knives along their cutting edge portions, as will be presently explained.

The grinding wheel assembly is keyed or otherwise secured to the shaft 17 against rotation relative thereto, but it is capable of being adjusted along the same in order to bring the grinding wheel into grinding contact with the several knives, one after the other. As shown, the grinding wheel assembly comprises an inner sleeve 22, which surrounds the shaft 17, and is provided with a key or spline 23, which slides in a key way 23ª formed in the shaft. Threadedly mounted upon the inner sleeve 22 at one end is a locking collar 25, in which is contained a split ring 26, having a beveled end 27 that bears against a correspondingly beveled end 28 in the locking collar. The split ring bears against the end of the inner sleeve 22 and when the locking collar is screwed up tight it clamps the jaws of the split ring upon the shaft and rigidly fastens the grinding wheel assembly thereto. Upon the other end of the inner sleeve 22 is rigidly secured a knurled collar 29, which is taken hold of when the locking collar is being screwed on or unscrewed from the sleeve. If desired, the collars 25 and 29 may be provided with sockets to which may be applied a spanner wrench.

Surrounding the inner sleeve 22 is an outer sleeve 30 of the grinding wheel assembly, which sleeve is provided with a key or spline 31 that slides in a key way 31a formed in the inner sleeve 22. The outer sleeve 30 extends through the eye of the grinding wheel and is formed with a shoulder 33 that bears against one side of the grinding wheel; bearing against the other side thereof is a ring 34 which is held against the grinding wheel by a nut 35, threadedly mounted on the outer sleeve 30. This arrangement provides simple means for rigidly fastening the grinding wheel upon the outer sleeve of the grinding wheel assembly.

One form of knife 9 (see Fig. 7), which the present machine has been designed to grind, comprises a flat slotted hub portion 9a, and a flat blade 9b, having a cutting edge 9c, preferably extending through an arc of approximately one hundred eighty degrees and of spiral shape, progressing outwardly along a curvilinear line from its shortest radius as at 9d to its longest radius as at 9e. The back edge 9f of the knife desirably extends in a straight line tangent to the axis of rotation of the knife to the edge of the slot in the hub portion. The knife is provided with holes 54 to receive bolts for attaching it to its mounting in the cutting machine in which it is used.

During the grinding operation of any knife 9, the grinding wheel is moved by the knife along the shaft 17 by reason of the fact that the knife travels along the beveled face of the grinding wheel from its periphery towards its axis.

Fig. 4 shows an endmost knife in the position occupied at the commencement of the grinding operation on its left hand side—that is, with the knife at its shortest radius contacting with a beveled face of the grinding wheel at its greatest radius, and Fig. 3 shows the position occupied by a knife and the grinding wheel at the completion of the grinding operation with that part of its knife edge of its longest radius in contact with the grinding wheel at the smallest radius of the grinding surface.

When sharpening one side of a knife, the grinding wheel is moved in one direction along the shaft (see arrow a, Fig. 4), and when sharpening the other side of the knife, the wheel is moved in the opposite direction (see arrow b, Fig. 3) and resilient means are employed on both sides of the grinding wheel to press the latter into grinding contact with the knife which it is grinding.

As shown, two collars 36, 37 are mounted on the inner sleeve 32, one at each end of the outer sleeve 30, both of which collars have means such as a set screw 21 and a key 21a for rigidly fastening them to the inner sleeve. Rigidly fastened to the inner sleeve are other collars 38, 39, and between the collars 36, 38 and 37, 39, are coiled compression springs 40, one of which, at a time, serves to hold the grinding wheel in grinding contact with the knife which it is grinding. When grinding the right hand side of a knife, as indicated in Fig. 3, the collar 36 is rigidly fastened by its set screw and key to the inner sleeve 22, whereas the collar 37 is loose thereon so that it may move along the inner sleeve with the outer sleeve. In setting the collar 36, the grinding wheel assembly is unlocked from the shaft and the smallest radius of a knife is presented to the grinding wheel, and the latter is adjusted against the cutting edge portion of the knife at the smallest radius thereof, as is shown in Fig. 7 in solid lines, with the end of the inner sleeve 22 engaging the collar 36, and the collar 36 is then fastened by its set screw and key to the inner sleeve. Subsequently, the locked collar limits the movement of the grinding wheel towards the side of the knife which it is grinding, so that during the operation of the machine the knife may rotate in its true plane and engage the beveled face of the grinding wheel without any danger of striking the edge thereof.

Mounted on the cross-frame members 13, are bearing boxes 41 that support the knife carrying assembly designated generally by the character 42. The axes of the grinding wheel assembly and knife carrying assembly are parallel and are suitably spaced apart to permit rotation of the knives 9, one at a time along a beveled face of the grinding wheel.

In the form of knife carrying assembly illustrated, there is a sleeve 43, which surrounds a rod 44 that extends through the bearing boxes 41 and has end sleeves 45, 46 thereon, which extend from the sleeve 43 of the knife carrying assembly through the bearing boxes 41 and are journaled therein. The sleeve 43 has a head or enlargement 47 on one end, and has nuts 48 threadedly secured on its other end, and between said head and nuts are clamped a series of spacers 49, with the knives 9 therebetween and two clamp rings 50. The spacers have keys 51, which seat in a key way 52 in the sleeve 43 and the spacers and clamp rings have pins 53 that enter the holes 54 in the knives. This arrangement provides simple means for rigidly connecting the knives with the sleeve 43.

The sleeve 46 is the driving sleeve for the knife carrying assembly and it is held against endwise movement in its bearing box by collars 55, pinned to the sleeve and bearing against the ends of the bearing box. On the inner end of the driving sleeve is a head or enlargement 56 that is formed on one face with clutch lugs 57 that engage in grooves formed in the end face of the head 47 of the sleeve 43. This arrangement provides a simple clutch connection between the driving sleeve and the knife carrying assembly. The sleeve 45 is held against the other end of the sleeve 43 by a nut 58 threadedly mounted on the adjacent end of the rod 44. On the other end of the rod 44 is secured a head 44a by means of which the rod may be withdrawn from the sleeves. A collar 59 pinned to the sleeve 45 serves to prevent said sleeve from being pushed through the bearing box when the knife carrying assembly is removed from the machine.

For removing the knife carrying assembly from the machine, and replacing it thereon, a crane 60 is employed which may be mounted on the frame of the machine and is provided with a swinging arm 61, hoisting mechanism 62 and hooks 63 that are adapted to be brought into supporting engagement with two of the spacers of the knife carrying assembly. To remove the knife carrying assembly, the nut 58 is unscrewed from the rod 44 and the latter is then withdrawn from the sleeves 45, 43 and 46, which leaves the knife carrying assembly supported by the crane. The sleeve 45 is then moved away from the end of the sleeve 43, and the knife carrying assembly is unclutched from the driving sleeve, which leaves it free to be lifted out of the machine by the hoist and placed upon a suitable support, where it may be disassembled. When other knives are to be sharpened, they are assembled in the knife carrying assembly, and the latter hoisted into place in alignment with the axis of the sleeves 45, 46, and clutched to the driving sleeve 46, after which the rod 44 is inserted into the driving sleeve, the sleeve of the knife carrying assembly and the sleeve 45, the latter moved up against the end of the sleeve 43, and the nut 58 is screwed back on the rod 44.

Suitable driving mechanism is provided for the grinding wheel assembly and knife carrying assembly, and as shown, said driving mechanism comprises an electric motor 64, which is mounted on supports 65 carried by the frame of the machine. Mounted upon the frame of the machine is a speed reducing gearing 66, which has a sheave 67 on its high speed shaft. Trained around said sheave 67 and around a sheave 68 on the motor shaft, and a sheave 69 on the shaft 17 for the knife carrying assembly is a belt 70. Trained around a sprocket wheel 71 on the low speed shaft of the speed reducing gearing and around a sprocket wheel 72 on the driving sheave 46 is a sprocket chain 73. This provides simple drive mechanism for driving the grinding wheel at a high rate of speed as compared with a low rate of speed for the knife carrying assembly.

In the operation of the machine, the knife carrying assembly is assembled and coupled to the machine as above described, and it is then turned around until the shortest radius of an endmost knife is presented to the side face of the grinding wheel (see Figs. 4 and 7). If the right hand sides of the knives are to be ground, the grinding wheel assembly is unlocked from the shaft 17, and moved towards the left, bringing the grinding wheel into contact with the right hand cutting edge portion of the endmost knife with enough spring pressure behind it to press the grinding wheel into grinding contact with the knife. The collar 36 (which has been held in contact with the outer sleeve by the spring 40 behind it) is then tightened upon the inner sleeve. The collar 37 is left loose on the inner sleeve. The motor is then started and it rapidly rotates the grinding wheel assembly and slowly rotates the knife carrying assembly through the respective driving connections.

The knife which is being ground rotates in its true plane, and as the longer radii of its curved cutting edge encounter the beveled face of the driving wheel, it crowds the latter to the right, as viewed in Fig. 3, until the longest radius of the knife reaches the beveled face of the grinding wheel, which position of the knife is seen in Figs. 1, 2, 3, 6, and in dotted lines in Fig. 7. At this time, the grinding wheel and the outer sleeve have been shifted to the right against the pressure of the spring 40 at the right by the knife in riding along the beveled face of the grinding wheel and the outer sleeve has been moved away from the collar 36 a distance equal to the distance that the grinding wheel has been shifted. As the cutting edge portion of the knife runs off the grinding wheel, the right hand spring 40 (see Fig. 3) shifts the outer sleeve and therewith the grinding wheel back until the sleeve contacts with the collar 36, whereby the grinding wheel is again located accurately in the same plane it occupied when it previously commenced to grind the knife edge.

The motor is permitted to run until, in the judgment of the attendant, that side of the knife has been ground sufficiently. The motor is then stopped, the knife assembly turned until the blank space between the ends of the knife blade is presented to the grinding wheel, thus permitting the latter to be shifted past the ground knife to the next adjacent one. The locking nut 25 is then turned back to unlock the grinding wheel assembly from the shaft 17 and the grinding wheel assembly is then shifted to the left until the edge portion of the tapered face of the grinding wheel is brought into grinding contact with said next adjacent knife at its shortest radius, and the locking nut is then screwed up tight to lock the grinding wheel assembly to the shaft. The motor is then started and one side of the knife is ground as has been explained in connection with the first one. This operation is repeated until the right hand sides of all of the knives have been ground.

To grind the other sides of the knives, the grinding wheel assembly is unlocked from the shaft 17 and shifted to the left so as to bring the grinding wheel on the left side of the endmost knife. The locked collar 36 is unlocked from the inner sleeve, thereby permitting both springs to press the collars against the ends of the outer sleeve. The grinding wheel assembly is then shifted to the right until the grinding wheel bears against the endmost knife at its smallest radius under spring pressure of the left hand spring 40, which is sufficient, in the judgment of the attendant, to properly grind the knife; and the right hand collar 37 is then locked upon the inner sleeve against the end of the outer sleeve.

The left hand side of the several knives are then ground in the same manner as has been described in connection with the grinding of their right hand sides. When all of the knives have been ground, the hooks of the hoist are attached to the knife carrying assembly, the rod 44 withdrawn, the knife carrying assembly unclutched from the driving sleeve, and the hoist is then manipulated to lift and swing the knife carrying assembly to one side of the machine and lower it upon a suitable support.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. In a knife grinder for grinding curved edged knives, the combination of a rotatable knife carrying assembly in which is rigidly mounted a curved edged knife whose curved knife edge progresses outwardly along a curvilinear line from a minimum radius to a maximum radius, said knife being mounted to rotate on the axis of the knife carrying assembly, a grinding wheel shaft, the axes of the knife-carrying assembly and grinding wheel shaft being parallel and fixed with relation to each other, a grinding wheel mounted on said grinding wheel shaft to rotate therewith and having a sliding connection therewith, said grinding wheel having side faces, which taper toward each other, from its hub portion to its periphery and along which a side of the curved edge portion of a knife from its minimum to its maximum radius rides from the periphery of the grinding wheel toward the hub portion and thereby moves the grinding wheel longitudinally of the shaft, resilient means to urge the grinding wheel into grinding contact with a side of the edge portion of a knife, other resilient means to urge the grinding wheel into grinding contact with the opposite side of the edge portion of the knife, adjustable stop means to limit movement of the grinding wheel lengthwise of the shaft caused by said resilient means, and driving means for rotating said knife carrying assembly and the grinding wheel shaft.

2. In a knife grinder, the combination of a rotatable knife carrying assembly having one or more curved edge knives fixedly mounted thereon to rotate on the axis thereof, the curved knife edge of each knife progressing outwardly along a curvilinear line from a minimum radius to a maximum radius, a rotatable grinding wheel assembly having a grinding wheel mounted to rotate therewith and having a sliding connection therewith, the side faces of the grinding wheel tapering toward each other from its hub portion to its periphery, the axes of the knife carrying assembly and grinding wheel assembly being parallel and fixed with respect to each other, resilient means on said grinding wheel assembly for urging the grinding wheel against one side of the cutting edge portion of a knife, other resilient means to urge the grinding wheel into grinding contact with the opposite side of the edge portion of the knife, adjustable stop means to limit the movement of the grinding wheel caused by said resilient means, a shaft upon which the grinding wheel assembly is adjustably mounted to rotate therewith, and motor driven driving means for rotating said grinding wheel assembly shaft and said knife carrying assembly.

3. In a knife grinder, the combination of a rotatable knife carrying assembly having several curved edge knives fixedly mounted thereon, the curved knife edges of said knives progressing outwardly along curvilinear lines from a minimum radius to a maximum radius, a rotatable grinding wheel assembly having a grinding wheel mounted to rotate therewith and having a sliding connection therewith, the side faces of the grinding wheel tapering towards each other from its hub portion to its periphery, the axes of the knife-carrying assembly and grinding wheel assembly being parallel and fixed with respect to each other, resilient means on said grinding wheel assembly for urging the grinding wheel against one side of the cutting edge portion of a knife, other resilient means to urge the grinding wheel into grinding contact with the opposite side of the edge portion of the knife, adjustable stop means to limit the movement of the grinding wheel caused by said resilient means, a shaft upon which the grinding wheel assembly is mounted to rotate therewith and upon which it is shiftable to bring the grinding wheel into grinding contact with the several knives, means to lock the grinding wheel assembly to said shaft and motor driven driving means for rotating said grinding wheel assembly shaft and said knife carrying assembly.

4. In a knife grinder, the combination of a rotatable knife carrying assembly having a curved edge knife fixedly mounted thereon, a rotatable grinding wheel assembly comprising an inner sleeve, an outer grinding wheel carrying sleeve slidably mounted on said inner sleeve and connected to rotate therewith, a grinding wheel fixedly mounted on said outer sleeve, said grinding wheel having side faces which taper toward each other from its hub portion to its periphery, means on said inner sleeve to limit endwise movement of the outer sleeve on the inner one, and resilient means carried by said inner sleeve to urge the outer sleeve in one direction and therewith urge the grinding wheel into grinding contact with a side of the cutting edge portion of a knife, a shaft upon which the grinding wheel assembly is mounted for sliding movement thereon, locking means to lock the inner sleeve to said shaft, and motor driven means for rotating said grinding wheel assembly shaft and said knife carrying assembly.

5. In a knife grinder, the combination of a rotatable knife carrying assembly having several curved edge knives fixedly mounted thereon, a rotatable grinding wheel assembly comprising an inner sleeve, an outer grinding wheel carrying sleeve slidably mounted on said inner sleeve and connected to rotate therewith, a grinding wheel fixedly mounted on said outer sleeve, said grinding wheel having side faces which taper toward each other from its hub portion to its periphery, means on said inner sleeve to limit endwise movement of the outer sleeve on the inner one, and resilient means carried by said inner sleeve to urge the outer sleeve in one direction and therewith urge the grinding wheel into grinding contact with a side of the cutting edge portion of a knife, a shaft upon which the grinding wheel assembly is mounted to rotate therewith and upon which it is shiftable to bring the grinding wheel into grinding contact with the several knives, means to lock the grinding wheel assembly to said shaft, and motor driven means for rotating said grinding wheel assembly shaft and said knife carrying assembly.

6. In a knife grinder, the combination of a rotatable knife carrying assembly having several curved edge knives fixedly mounted thereon, a rotatable grinding wheel assembly comprising an inner sleeve, an outer grinding wheel carrying sleeve slidably mounted on said inner sleeve and connected to rotate therewith, a grinding wheel fixedly mounted on said outer sleeve, said grinding wheel having side faces that taper toward each other from its hub portion to its periphery, two collars, one mounted on the inner sleeve at each end of the outer sleeve, each of which collars has means to rigidly fasten it to the inner sleeve, and one of which is fastened to the inner sleeve, and the other one is loose thereon and bears against the outer sleeve; and resilient means serving to urge the loose collar and outer sleeve in a direction toward the tight collar and therewith urge the grinding wheel into grinding contact with one side of the cutting edge of a knife, a shaft upon which the grinding wheel assembly is mounted for sliding movement thereon, locking means to lock the inner sleeve to the shaft, and motor driven means for rotating said grinding wheel assembly shaft and said knife carrying assembly.

7. In a knife grinder, the combination of a rotatable knife carrying assembly having several knives fixedly mounted thereon, a rotatable grinding wheel assembly comprising an inner sleeve, an outer grinding wheel carrying sleeve slidably mounted on said inner sleeve and connected to rotate therewith, a grinding wheel fixedly mounted on said outer sleeve, two collars, one mounted on the inner sleeve at each end of the outer sleeve, each of which collars has means to rigidly fasten it to the inner sleeve, and one of which is fastened to the inner sleeve, and the other one is loose thereon and bears against the outer sleeve, and resilient means serving to urge the loose collar and outer sleeve in a direction toward the tight collar and therewith urge the grinding wheel into grinding contact with one side of the cutting edge of a knife, a shaft upon which the grinding wheel assembly is mounted to rotate therewith, and upon which it is shiftable to bring the grinding wheel into grinding contact with the several knives, means to lock the grinding wheel assembly to said shaft, and motor driven means for rotating said grinding wheel assembly shaft and said knife carrying assembly.

8. In a knife grinder, the combination of a rotatable knife carrying assembly having several knives fixedly mounted thereon, a rotatable grinding wheel assembly comprising an inner sleeve, an outer grinding wheel carrying sleeve, provided with a key sliding in a key way in the inner sleeve, a grinding wheel fixedly mounted on said outer sleeve, a collar fast on said inner sleeve to limit endwise movement of the outer sleeve on the inner one, and a coiled compression spring carried by the inner sleeve and adapted to urge the sleeve toward the collar and therewith urge the grinding wheel into grinding contact with a side edge portion of a knife, a shaft extending through said inner sleeve and having a key way, and said inner sleeve having a key sliding in the key way in the shaft, and motor driven driving means for rotating said grinding wheel assembly shaft and said knife carrying assembly.

9. In a knife grinder, the combination of a knife carrying assembly having a sleeve and several spaced knives fixedly secured thereon, two end sleeves in alignment therewith, one of which is a driving sleeve having a clutch connection with the knife carrying assembly, bearing boxes in which said end sleeves are journaled, a removable rod extending axially through the three aligned sleeves and forming the support for the first mentioned sleeve, and means on said rod to clamp the first mentioned sleeve between the end sleeves.

10. In a knife grinder, the combination of a knife carrying assembly having a sleeve, several knives thereon, spacers therebetween and clamp means to rigidly secure the knives and spacers on the sleeve, two end sleeves in alignment with the knife carrying assembly, one of which is a driving sleeve having a clutch connection with the knife carrying assembly, bearing boxes in which said end sleeves are journaled, a removable rod extending axially through the three aligned sleeves and forming the support for the first mentioned sleeve, and means on said rod to clamp the first mentioned sleeve between the end sleeves.

11. In a knife grinder, the combination of a driven shaft having a key way therein, an inner sleeve mounted on said shaft and having a key sliding in the key way thereof, locking means for locking said inner sleeve upon said shaft, an outer grinding wheel carrying sleeve mounted upon the inner sleeve and having a key sliding in a key way in said inner sleeve, a grinding wheel rigidly secured upon said outer sleeve and having beveled side faces which taper towards each other from the hub portion of the grinding wheel to its periphery, collars, one at each end of the outer sleeve, and one of which is rigidly fastened to the inner sleeve, and one loose thereon, other collars rigidly fastened to the inner sleeve and spaced from the first mentioned collars, and coiled compression springs interposed between the first mentioned collars and the second mentioned ones.

12. In a knife grinder for grinding curved edged knives, the combination of a rotatable knife carrying assembly in which curved edged knives are rigidly mounted to rotate on the axis of the knife carrying assembly, the curved knife edges of said knives progressing outwardly along curvilinear lines from a minimum radius to a maximum radius, a grinding wheel shaft, a grinding wheel mounted thereon to rotate therewith and having a sliding connection therewith, said grinding wheel having side faces, which taper toward each other, from its hub portion to its periphery and along which a side of the curved edge portion of a knife from its minimum to its maximum radius rides from the periphery of the grinding wheel toward the hub portion, and thereby moves the grinding wheel longitudinally along the grinding wheel shaft, resilient means to urge the grinding wheel into grinding contact with a side of the edge portion of a knife, other resilient means to urge the grinding wheel into grinding contact with the opposite side of the edge portion of the knife, adjustable stop means to limit movement of the grinding wheel lengthwise of the shaft caused by said resilient means, and driving means for rotating the grinding wheel assembly at high speed and the knife carrying assembly at low speed.

CHARLES H. DODGE.